United States Patent [19]

Grimaldi et al.

[11] Patent Number: 4,868,663
[45] Date of Patent: Sep. 19, 1989

[54] OPTICAL DEVICE FOR SCANNING STILL IMAGES IN TELEVISION

[75] Inventors: Jean L. Grimaldi, Ermont; Raymond Dellion, Gennevilliers; Pierre Michaud, Aulnay Sous Bois, all of France

[73] Assignee: Thomson Video Equipment, Cergy Saint-Christophe, France

[21] Appl. No.: 239,422

[22] Filed: Sep. 1, 1988

[30] Foreign Application Priority Data

Sep. 4, 1987 [FR] France ............... 87 12331

[51] Int. Cl.⁴ .................. H04N 5/30; H04N 3/40
[52] U.S. Cl. .................... 358/209; 358/215; 358/471
[58] Field of Search ............... 358/214–216, 358/294, 54–55, 209; 250/578

[56] References Cited

U.S. PATENT DOCUMENTS 3,624,291  11/1971  Miyata .................. 358/214
4,264,921  4/1981   Pennington et al. ...... 358/50

FOREIGN PATENT DOCUMENTS 2540319  8/1984  France .

Primary Examiner—Jin F. Ng
Assistant Examiner—Stephen Brinich
Attorney, Agent, or Firm—Cushman, Darby & Cushman

[57] ABSTRACT

The invention relates to a device for scanning still images as applicable in particular to high-definition television (HDTV) systems. In accordance with customary practice, the entire still image is converted by an optical system having an oscillating mirror to an image which passes in front of a linear sensor having photosensitive elements. Diffusion of the optical system causes detachment of dark areas which are adjacent to bright areas. In order to prevent this detachment, the movement of a shutter provided with slits is synchronized with the movement of the mirror so as to occult part of the image which passes in front of the sensor, thus leaving only the zone located at the level of the sensor.

8 Claims, 5 Drawing Sheets

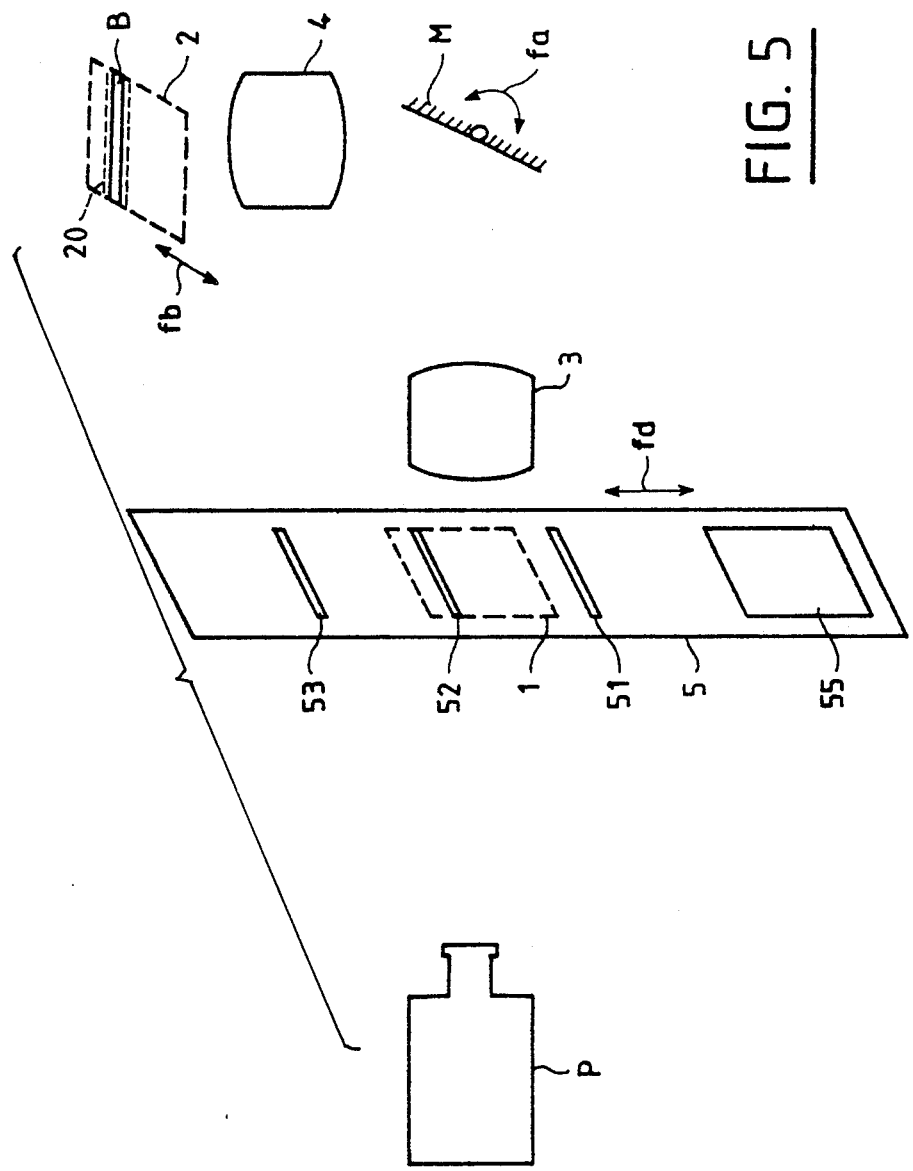

OPTICAL DEVICE FOR SCANNING STILL IMAGES IN TELEVISION

BACKGROUND OF THE INVENTION

1. Field of the Invention

The present invention relates to an optical device for scanning still images in television, of the type comprising an oscillating mirror and a linear sensor with photosensitive elements.

2. Description of the Prior Art

In known optical scanning devices of this type, the oscillating mirror forms part of an optical system which, starting from a still image placed in an object plane, forms and displaces an image of the still image in an image plane in which the linear sensor is located, thus permitting line-by-line scanning by means of the sensor. In order to carry out a scan in the three primary colors, a filter-carrier disk is provided so that three filters corresponding to the three scans to be performed can be inserted successively between the still image to be scanned and the sensor.

In these known devices, the diffusion of the optical system is such that the image formed in the image plane exhibits detachment of dark areas adjacent to bright areas, for example along the contours of illuminated objects.

SUMMARY OF THE INVENTION

The present invention makes it possible to remove or at least to reduce this drawback. Moreover, the invention permits the use of colored filters which are of smaller size and therefore less costly than the filters usually employed. The invention also makes it possible either to eliminate any problem of reflection of light from the filters to the object plane or, when this problem exists, to provide a remedy by setting the filters at a much smaller angle of slope than that which is necessary in known devices and which produces a colored spot phenomenon.

This is obtained by forming only part of the still image in the image plane.

In accordance with the invention, there is provided an optical device for scanning still images in television comprising an optical path with, in series on said optical path, an object plane for receiving a still image to be scanned, an oscillating mirror and an image plane which is an object-plane image produced by the device and comprising a linear sensor having photo-sensitive elements and disposed in the image plane, an optical assembly and movable occulting means associated with said optical assembly for selecting a rectilinear zone of the object plane in order to ensure that this zone alone is transmitted to the image plane, the image of said zone in the image plane being located on the photosensitive elements of the sensor, the occulting means being provided for this purpose with n slits (n: whole number at least equal to 1).

BRIEF DESCRIPTION OF THE DRAWINGS

FIGS. 2 to 5 are diagrams of optical devices in accordance with the invention.

In the different figures, corresponding elements are designated by the same references.

DETAILED DESCRIPTION OF THE INVENTION

Figure 1:
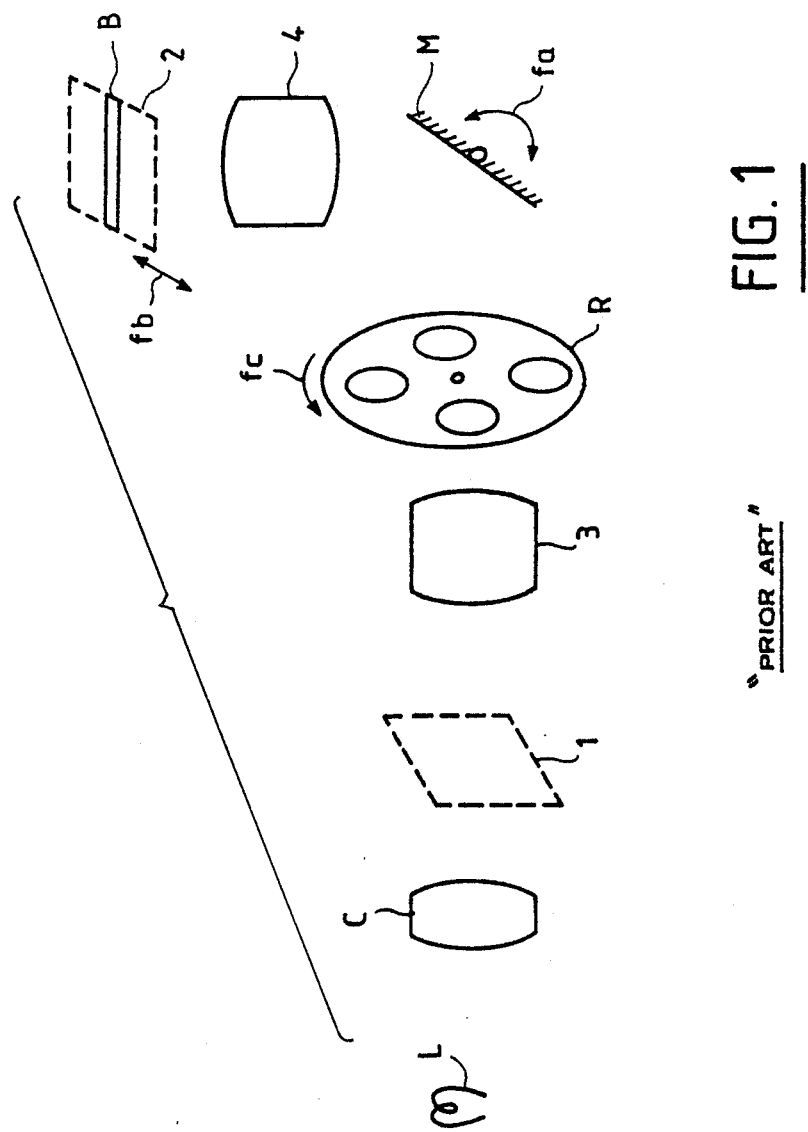
FIG. 1 is a diagram of an optical device in accordance with the prior art.

FIG. 1 is a schematic view of an optical device for scanning, in television, still images consisting of diapositives. In this optical device, the diapositives are placed in a plane 1 which is usually known as the object plane. The contour of a diapositive is indicated in dashed lines in the position which it occupies for scanning. The object plane is illuminated by a lamp L through a condenser C and a set of colored filters for preventing transmission of infrared rays and for obtaining the desired color temperature. In order to simplify the drawings and thus to highlight the elements which are specific to the invention, these colored filters are not shown either in FIG. 1 or in FIGS. 2 and 4.

The light which passes through the diapositive located in the object plane 1 then passes successively through an objective 3 and one of the four filters of a rotary filter-carrier disk R. The disk R is provided with three scanning filters corresponding to the three primary colors and one filter which is neutral from a colorimetric standpoint so as to permit scanning of the black and white levels. It should be noted that the scanning filters are not in a plane perpendicular to the optic axis (not shown) of the device but are inclined at 15 degrees with respect to this plane in order to prevent any return of parasitic light to the diapositive by reflection. By rotating the disk R about its axis as indicated schematically by an arrow fc, it is possible to select and to inert one of these four filters in the path of the light which comes from the diapositive located in the object plane 1.

After the objective 3, the light which has passed through and diapositive is reflected from an oscillating mirror M, the movement of which is indicated schematically by an arrow fa, then passes through another objective 4 so as to form an image of the diapositive in a plane 2 (usually known as the image plane). The contour of the image of the diapositive in the image plane 2 is indicated in dashed lines in the position which it occupies as a function of the position of the mirror M as shown in FIG. 1.

In the image plane 2 is placed a linear sensor B made up of photosensitive elements. By means of its movement of oscillation, the mirror M produces a translational displacement of the image of the diapositive in the image plane 2. Said translational displacement as represented schematically by an arrow fb makes it possible to pass the entire image of the diapositive in front of the photosensitive elements of the linear sensor B. This accordingly permits line-by-line scanning of the diapositive by means of the sensor. As mentioned at the beginning of this specification, a device of this type is subject to disadvantages and in particular to detachment of dark areas of the image which are adjacent to bright areas. In order to overcome this drawback at least to a fairly substantial extent, it is proposed as shown in the optical devices of FIGS. 2 to 4, to transmit only part of the object plane constituted by a rectilinear zone surrounding the line to be scanned at a given instant in the diapositive. This accordingly avoids any vertical diffusion at a distance greater than one-half the width of the illuminated surface.

Figure 2:
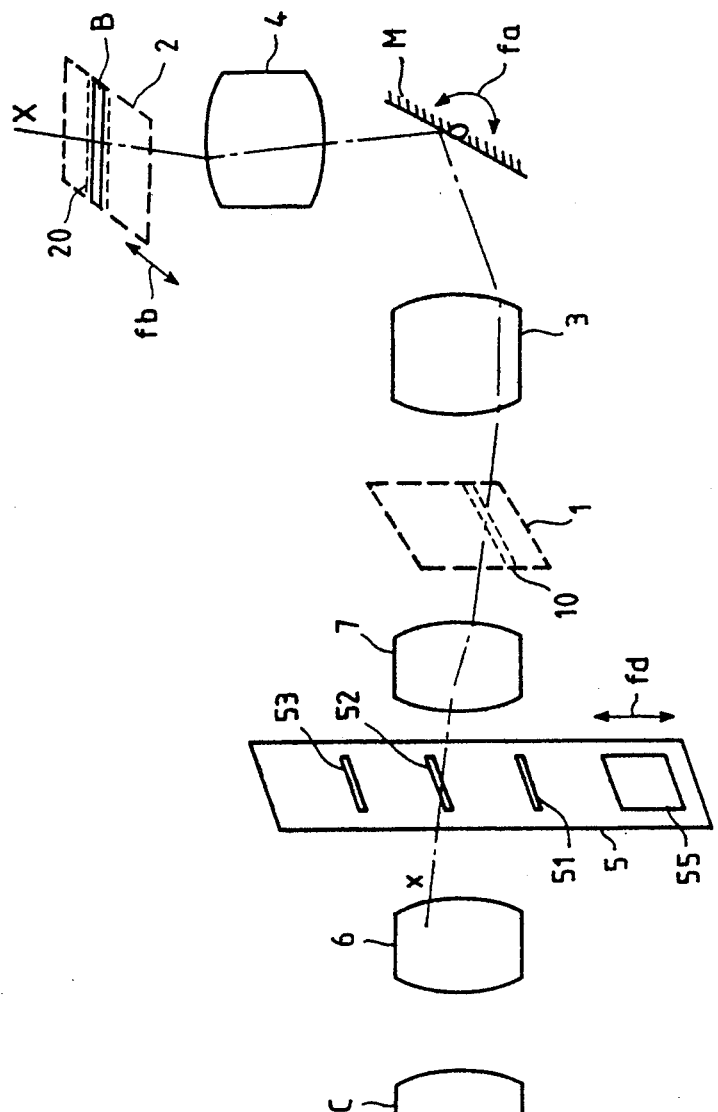

FIG. 2 is distinguished from FIG. 1 by the suppression of the filter-carrier disk R and by the addition of an objective 6 between the condenser C and the object plane 1, said objective 6 being followed by a movable shutter 5 which is in turn followed by an objective 7.

The shutter 5, the translational motion of which is represented schematically by an arrow fd, has three slits 51, 52, 53 and a rectangular hole 55. Three filters corresponding to the three primary colors are respectively disposed within the slits 51 to 53 whilst a neutral filter closes the hole 55. In order to ensure that the parasitic light reflected from the filter of a slit does not return to the slit after reflection from the objective 6, it is only necessary to incline the plane of said filter at an angle of one degree and not 15 degrees as in the case of FIG. 1.

A broken line X-X shown as an axis line represents the path of a light ray which emerges from the objective 6, passes through the slit 52 and the object plane 1 and passes through the image plane 2. In the object plane 1, the only zone which receives light is a narrow rectilinear band 10 having a contour represented by finer dashed lines than the dashed lines of the diapositive contour. Thus, in the image plane, it is not the entire image of the diapositive which is formed but simply a narrow band 20 by virtue of the occultation produced by the shutter. By synchronization between the motion of the mirror M and the motion of the shutter 5, this band can be caused to cover that portion of the image plane 2 in which are located the photosensitive elements of the linear sensor B. This synchronization, which relates to the same technique as synchronization of travel of a film in a motion-picture pickup of the oscillating mirror type will not be described in order to avoid entering into explanations which do not permit a clear understanding of the invention. It is sufficient to mention the fact that, in the example used for this description, the control elements which serve to determine the respective positions of the shutter 5 and of the mirror M consist of potentiometer pickups.

Thus, as the shutter moves, so the photo-sensitive elements of the pickup can detect the signals which are necessary for line-by-line scanning of the diapositive in the three primary colors, the three scans being respectively performed with the three slits.

It is worthy of note that the hole 55 of the shutter 5 of FIG. 2 could be replaced by a slit similar to the slits 51 to 53 on condition that this slit is provided with a neutral filter. In fact, the hole is better suited for a rapid and brief scan of black and white levels as was required of the apparatus described.

Figure 3:
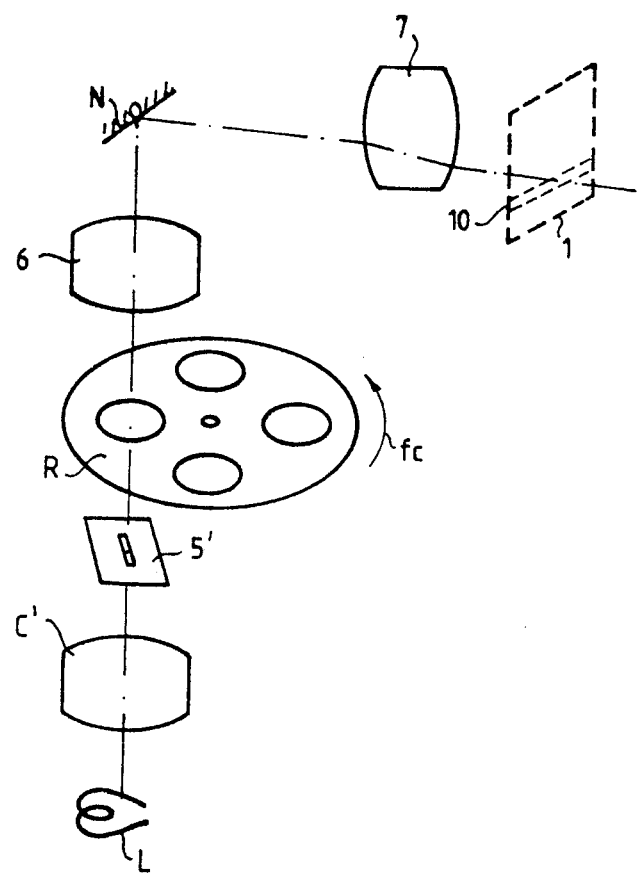

FIG. 3 shows an alternative form of construction in that portion of the optical device of FIG. 3 which is located between the lamp L and the object plane 1, the remainder of the device being unchanged. An optical path is formed between the lamp L and the object plane 1; it comprises successively: a condenser C', a stationary shutter 5' having a single slit, a filter-carrier disk R, an objective 6, an oscillating mirror N and an objective 7. The oscillating mirror N controlled as a function of the scan to be performed on the diapositive serves to produce an image of the slit which sweeps the object plane 1 in which the diapositive to be scanned is located. The colored filters are placed in the lighting path of the diapositive behind the slit by means of the disk R. Thus, with respect to the embodiment of FIG. 2, the moving mass is reduced. In particular, the movement of translation of the shutter is replaced by a movement of rotation of the filter-carrier disk. This embodiment of FIG. 3 offers a further advantage with respect to the embodiment of FIG. 2, namely the use of cylindrical lenses for the condenser C' and not of spherical lenses as was the case in FIG. 2. These lenses concentrate on the stationary slit a greater part of the light emitted by the lamp, thus making it possible to employ lamps of lower power and to improve the optical balance of the device.

Figure 4:
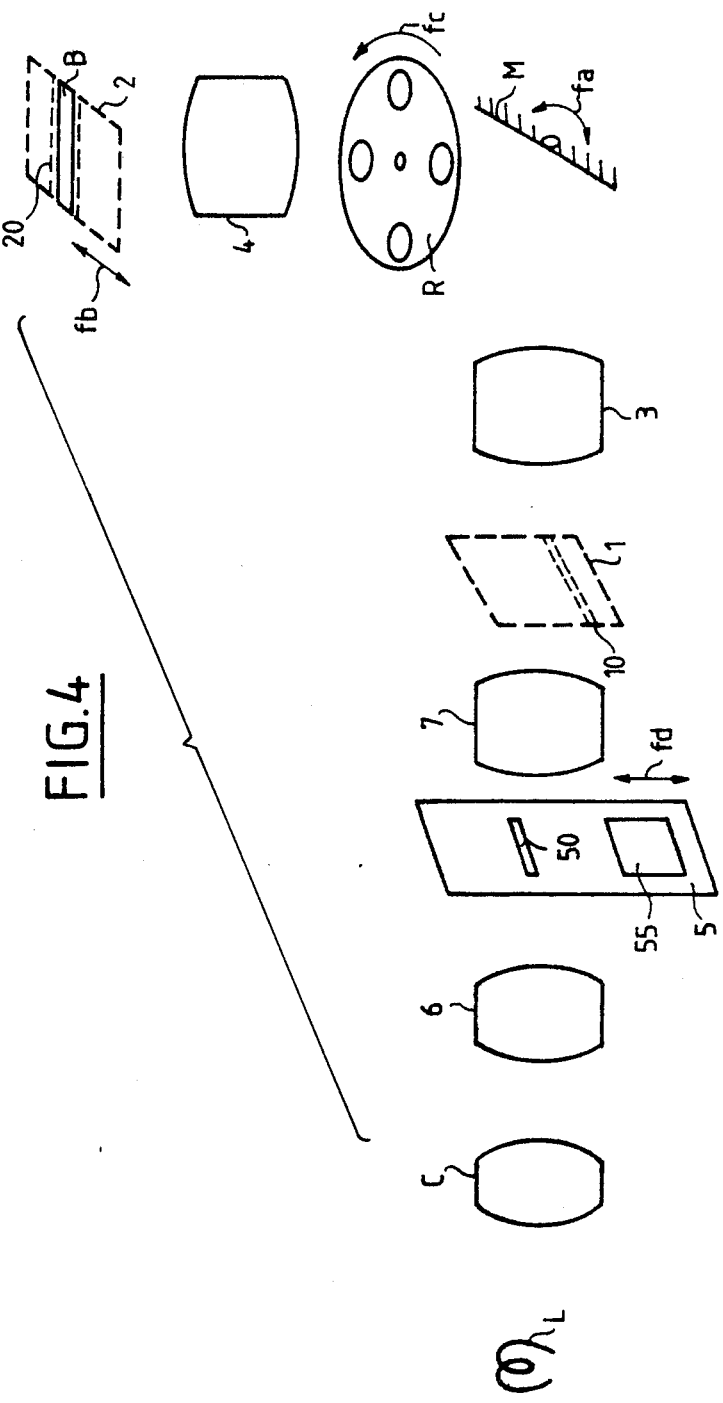

FIG. 4 is distinguished from FIG. 2 by the fact that the movable shutter 5 is in this case provided with only one slit 50 and one hole 55, both without filter, and that a movable filter-carrier disk R of the same type as the disk R of FIG. 1 is placed between the oscillating mirror M and the objective 4. In this construction, scanning in the three primary colors is carried out with the same slit 50 by passing successively through the three colored filters of the disk R. It should be noted with respect to FIG. 1 that the filters have not been inclined at an angle of 15 degrees but at an angle of one degree.

FIG. 5 is a schematic view of an optical system for television scanning of still images consisting of images projected by a projector P. There is thus defined an object plane 1 in which the images are projected. In the object plane 1 is disposed a movable shutter 5 which is similar to the movable shutter of FIG. 2 and has three slits 51 to 53 which are provided respectively with three filters and permit scanning of the still image in three primary colors. The contour of the still image in the object plane 1 is shown in dashed lines.

Behind the shutter 5, the optical device comprises an objective 3, a mirror M, an objective 4 and a linear sensor B which are similar to those of FIG. 2. This assembly produces a moving image of the still image contained in the object plane 1, said moving image being located in an image plane 2 containing the photosensitive elements of the sensor B. As in the case of FIGS. 2 and 3, said moving image is reduced to a narrow rectangular band 20 which covers the photosensitive elements of the sensor by means of the slits and by means of a control for producing displacements of the shutter 5 and of the mirror M in synchronism. Depending on the slit employed for occulting the light from the projector, it is thus possible to carry out line-by-line scanning in one of the three primary colors and by means of the signals delivered by the photosensitive elements of the sensor.

The present invention is not limited to the examples described with reference to FIGS. 2 to 5. From this it follows in particular that the invention applies, in black and white television, to scanning of images contained in a fixed plane. Similarly, the shutter can have groups of slits as may be required for scanning in the three primary colors: a number of successive groups of three slits with filters such as the group 51 to 52 in FIGS. 2 and 5 or a succession of slits without filters such as the slit of the shutter 5' of FIG. 3 or the slit 50 in FIG. 4. In regard to the holes such as the hole 55 in FIGS. 2, 4 and 5, they may either not exist or else be replaced if necessary by complete withdrawal of the shutter 5.

What is claimed is:

1. An optical device for scanning still images in television comprising an optical path with, in series on said optical path, an object plane for receiving a still image to be scanned, an oscillating mirror, and an image plane which is an object-plane image produced by the device and comprising a linear sensor having photo-sensitive elements and disposed in the image plane, an optical assembly and movable occulting means associated with said optical assembly for selecting a rectilinear zone of the object plane in order to ensure that this zone alone is transmitted to the image plane, the image of said zone in the image plane being located on the photosensitive elements of the sensor, the occulting means being provided for this purpose with n slits (n=a whole number at least equal to 1).

2. An optical device according to claim 1, wherein the still image to be scanned is a diapositive and wherein the occulting means are placed upstream of the object plane on the optical path of the device.

3. An optical device according to claim 1, wherein the still image to be scanned is an image supplied by a projector and wherein the occulting means are disposed in the object plane.

4. An optical device according to claim 2, wherein the occulting means include a shutter provided with at least one slit and wherein said shutter is capable of moving in a plane perpendicular to the optical path.

5. An optical device according to claim 2, wherein the occulting means include a fixed shutter pierced by a slit followed on the optical path by an oscillating mirror.

6. An optical device according to claim 5, wherein the slit is preceded on the optical path by a cylindrical lens.

7. An optical device according to claim 1, wherein n is at least equal to 3 and wherein three of the n slits each have a colored filter, the three filters of said three slits being such as to correspond respectively to three distinct primary colors.

8. A device according to claim 1, wherein a filter-carrier disk is inserted in the optical path and wherein n=1.

* * * * *